Figure 12:
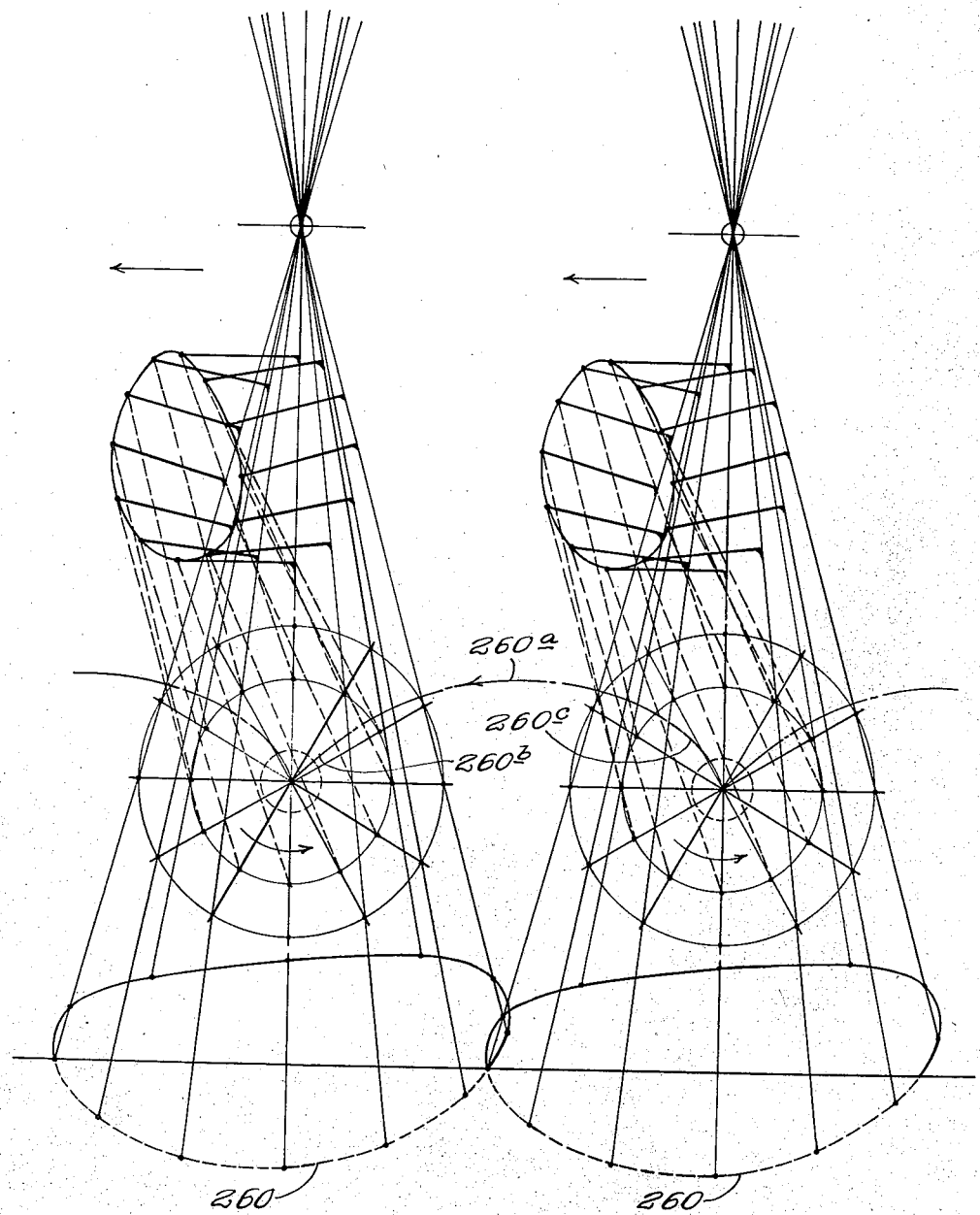

July 14, 1942. J. W. PAGE 2,290,118
WALKING MECHANISM
Filed Aug. 28, 1941 6 Sheets-Sheet 1
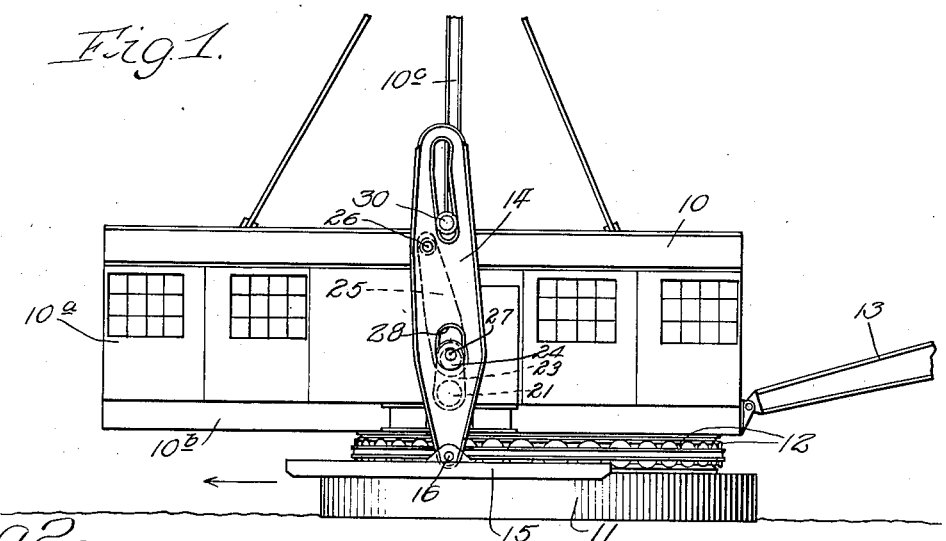
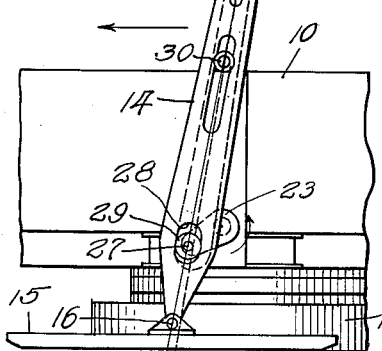
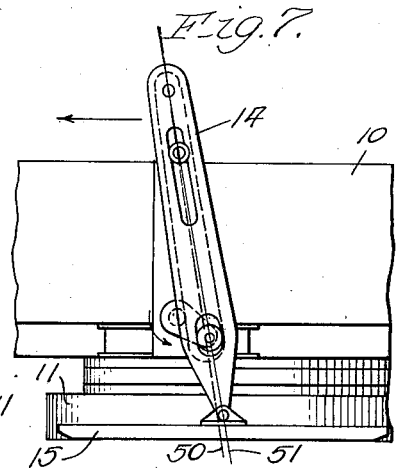
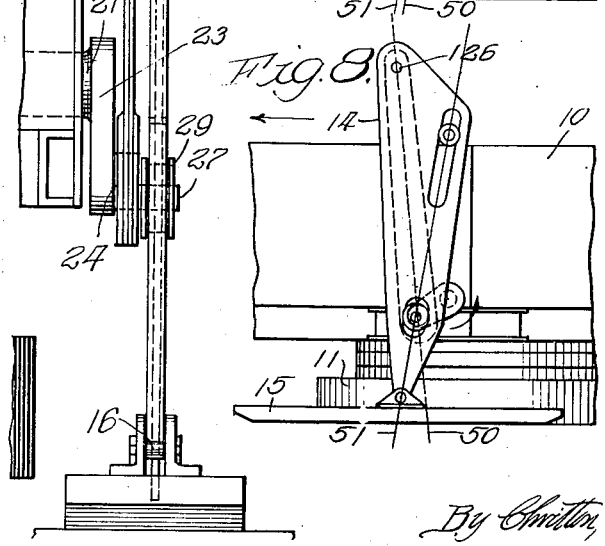
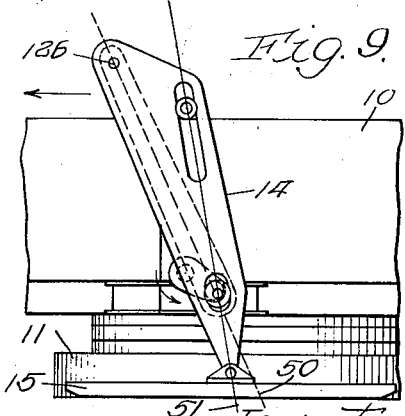
Inventor.
John W. Page,
By Critton, Wiles, Davis & Hinck, Attys.

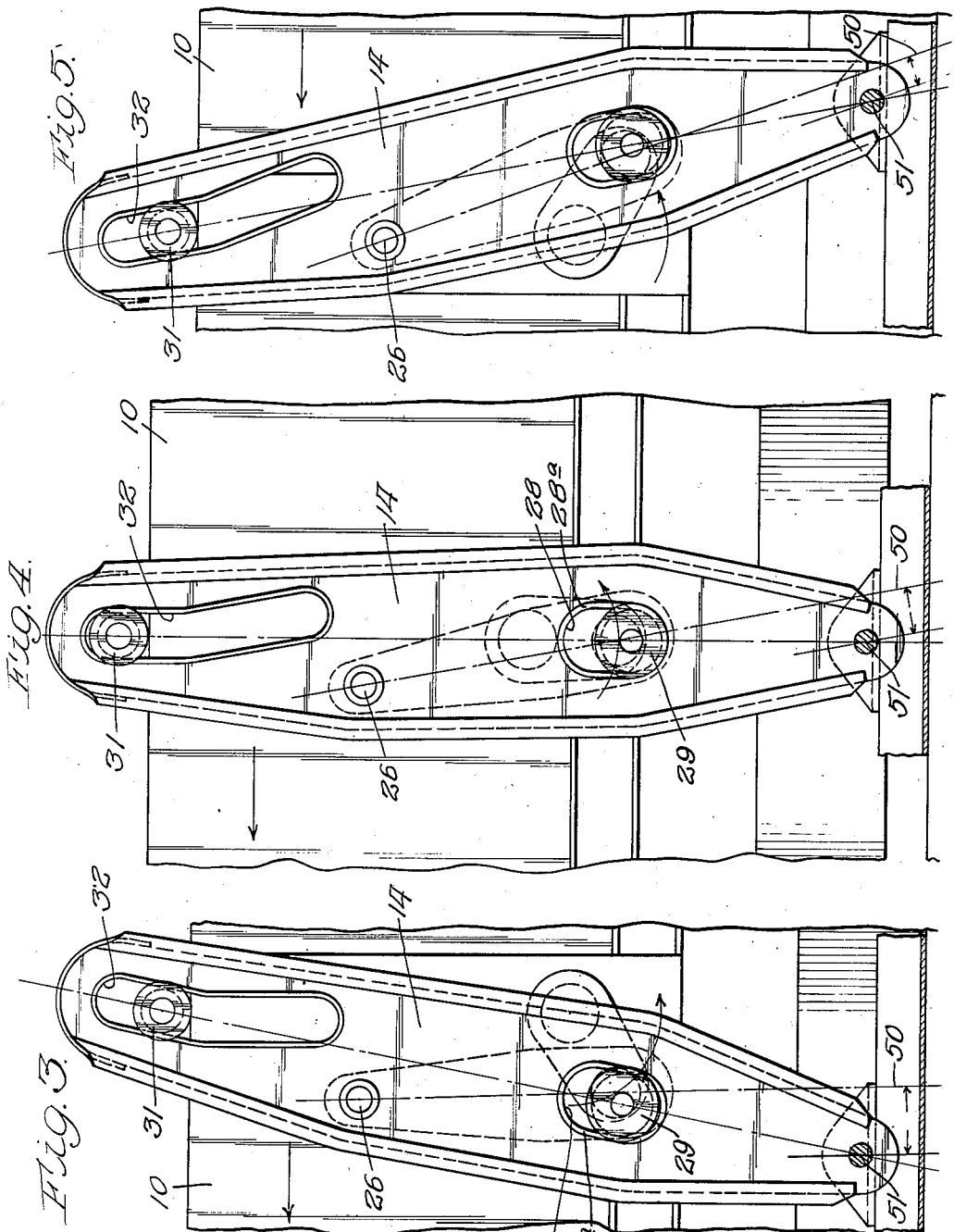

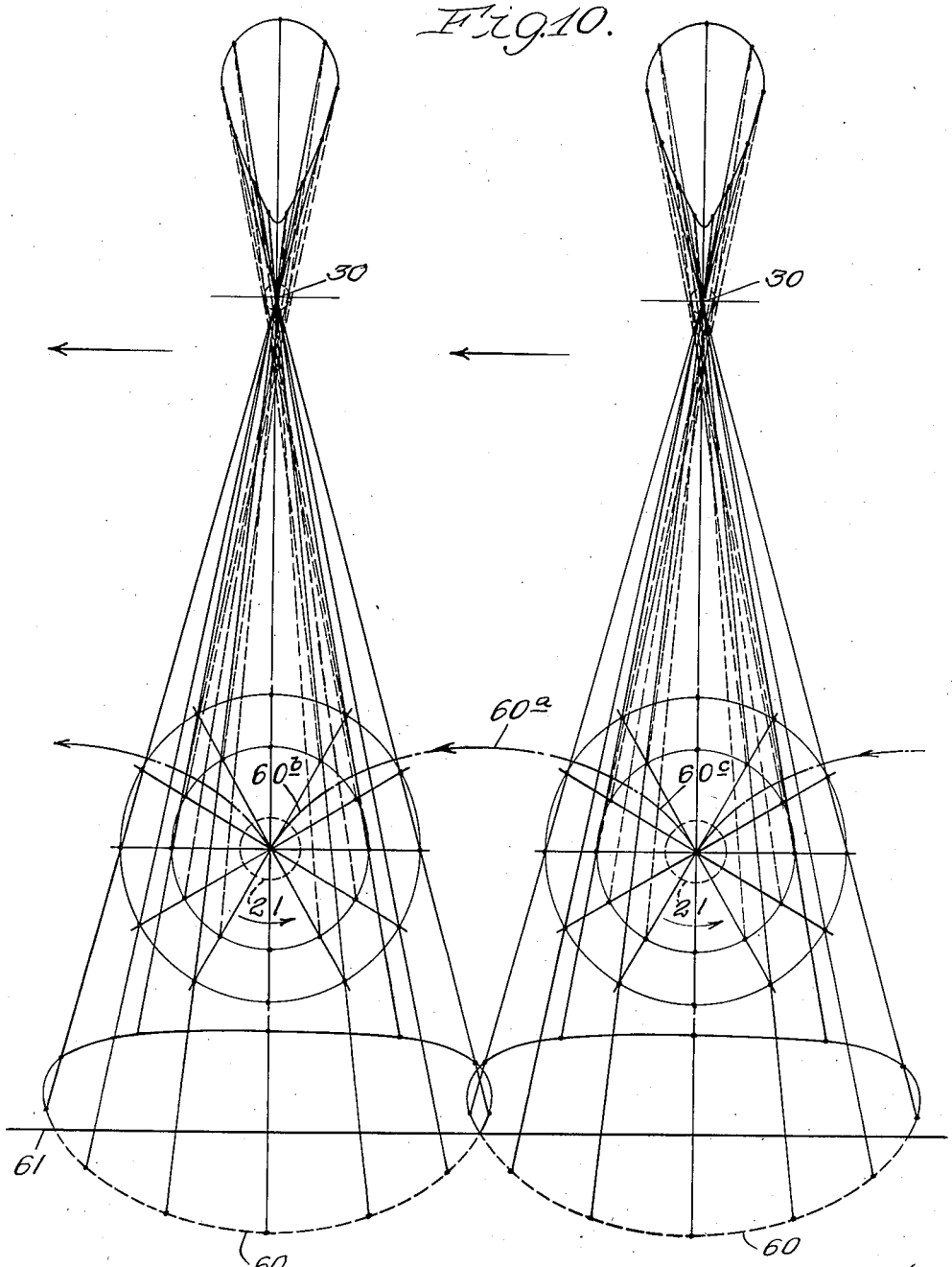

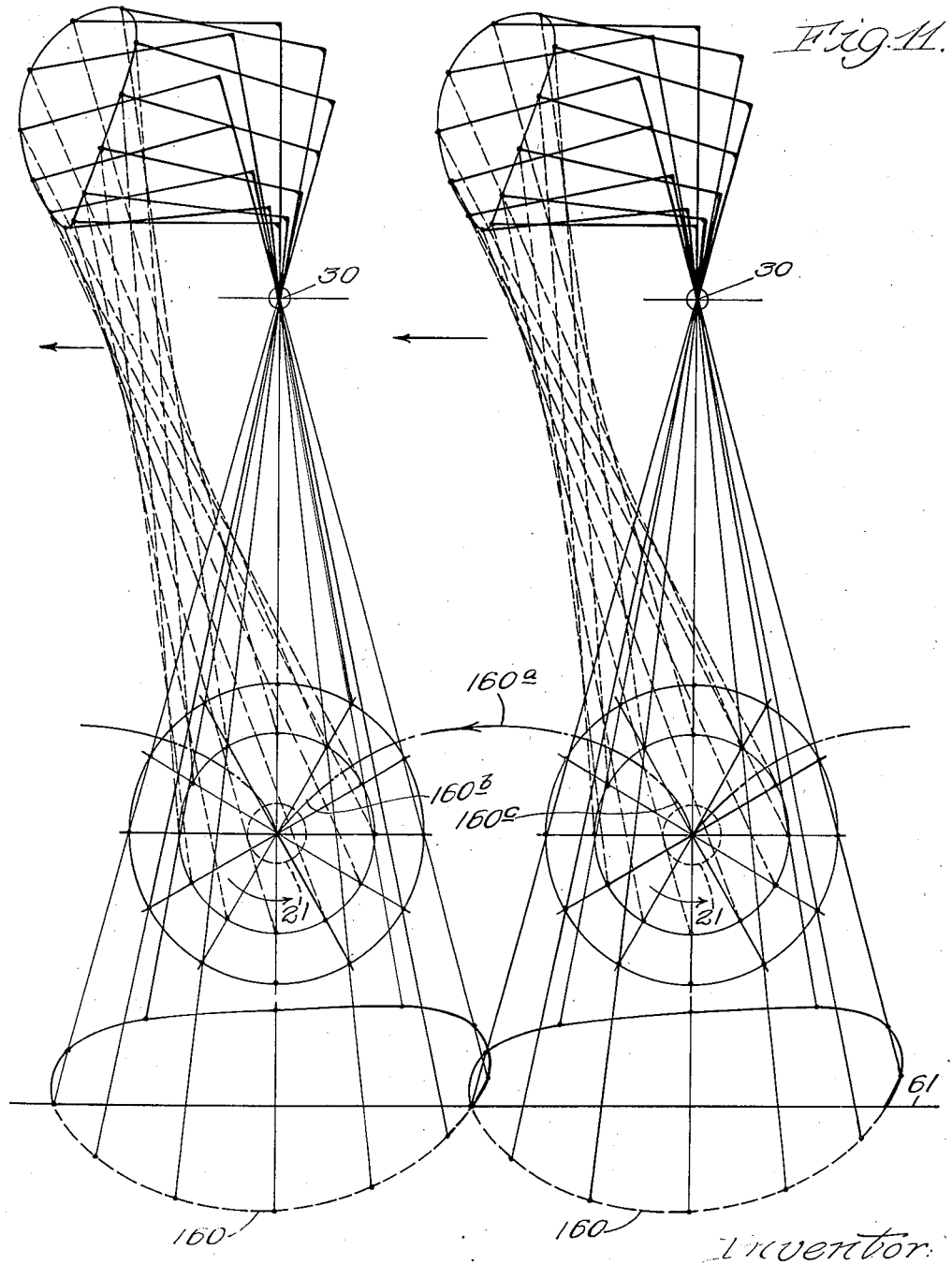

July 14, 1942.  J. W. PAGE  2,290,118
WALKING MECHANISM
Filed Aug. 28, 1941  6 Sheets-Sheet 5

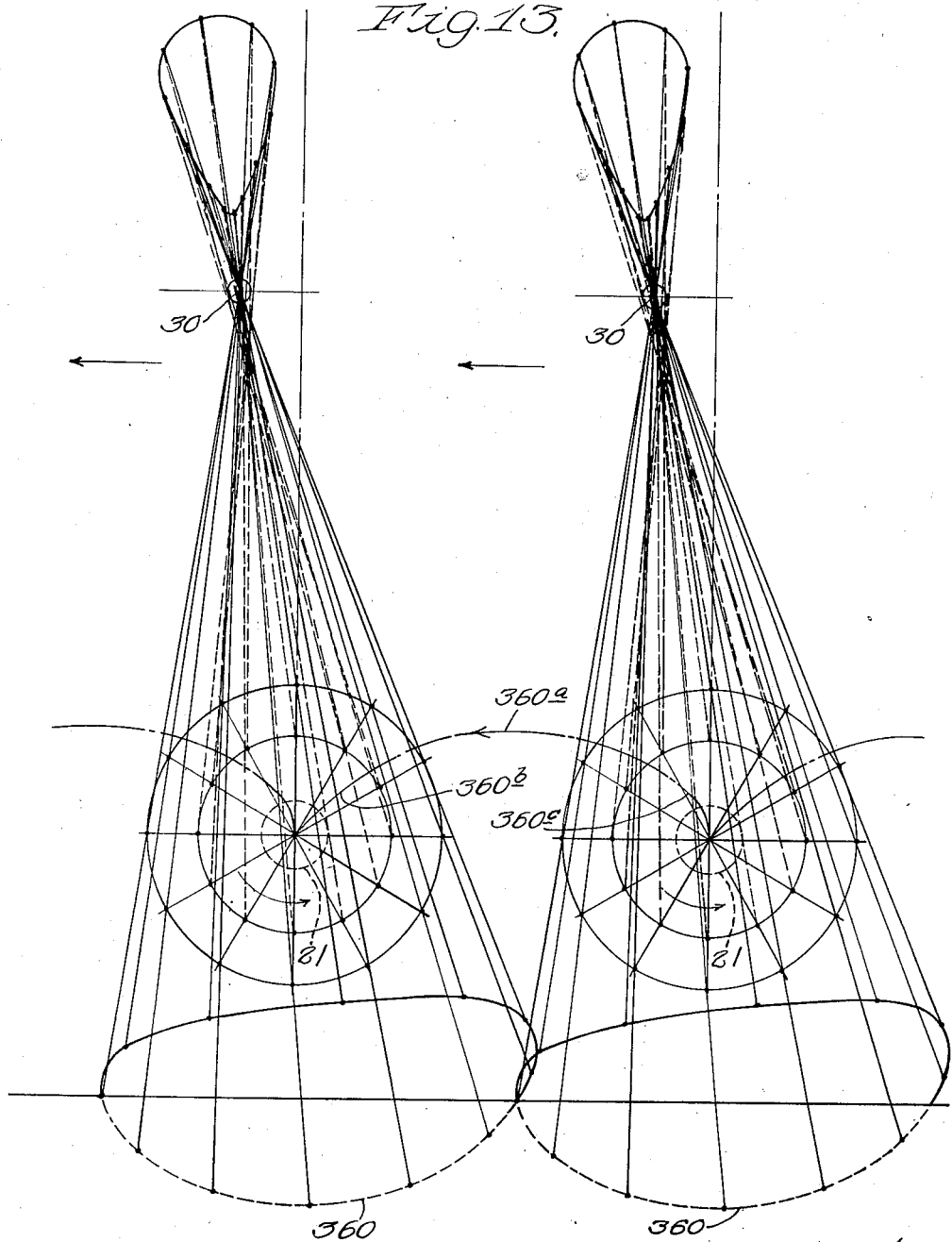

UNITED STATES PATENT OFFICE 2,290,118

WALKING MECHANISM

John W. Page, Chicago, Ill., assignor to Page Engineering Company, a corporation of Illinois Application August 28, 1941, Serial No. 408,689

5 Claims. (Cl. 180—8)

This invention relates to improvements in walking mechanism and is especially applicable to walking mechanism for dredges, derricks, and similar heavy structures.

The invention constitutes an improvement upon the type of mechanism disclosed in my earlier Patents No. 2,164,120, issued June 27, 1939, and No. 2,230,759, issued February 4, 1941.

In walking mechanism of the character described, the structure is alternately raised, advanced and lowered. Since the structure is ordinarily of very great weight the downward movement has ordinarily been quite fast, causing considerable shock upon its contact with the ground. The principal feature of this invention is to provide means for the retarding of the descent of the structure during its downward movement.

In general, the mechanism includes a crank and crank pin, a leg, and a link connecting the leg with the crank pin as shown in my earlier patents. There is also a second crank pin on the crank with a greater radius, that is, lying further from the center of the shaft. This second crank pin engages a slot in the leg that permits substantially vertical movement of the pin with respect to the leg but not horizontal movement. The principal purpose of the two crank pins is to cause the crank pin with the longer radius to swing the lower end of the leg somewhat further horizontally, that is, to cause it to take a longer step. In the construction shown in those patents, however, the link has a force or moment in front of (considering the direction of walking movement) the point of connection between the leg and shoe when the body is descending. The principal feature of this invention is to cause this moment to lie back of this point during the downward movement of the structure. This moment, therefore, serves to retard such downward movement rather than accelerate it. A convenient way of accomplishing this is to shift the upper end of the link forwardly on the leg so that a line drawn downwardly through the center of the link extended will strike the shoe to the rear of the leg connection (when the body or structure is descending) rather than in front of it. As a matter of fact, in the construction I have here disclosed such moment lies to the rear of the shoe connection during the entire cycle of leg operation.

Other features and advantages of my invention will appear more fully as I proceed with my specification.

In those forms of device embodying the features of my invention illustrated in the accompanying drawings, Fig. 1 is a view in side elevation; Fig. 2 is a view in front elevation of the leg showing the link connection; Figs. 3, 4 and 5 are sequential views in side elevation of the leg showing walking movement; Figs. 6 and 7 are similar views showing the construction of the earlier patents; Figs. 8 and 9 are similar views showing a modified form embodying the present invention; and Figs. 10-13 are diagrammatic views showing the leg movement.

As shown in the drawings, 10 may indicate any suitable body which is to be self-propelled. As here shown, this body includes a house 10a mounted on a platform 10b. It also includes suitable framework 10c and the cross-member 10d. The house 10a may contain suitable power means for driving the propelling mechanism and also any excavating or other apparatus it is desired to operate.

11 indicates a base rotatably connected to the body 10 and so designed that it will be lifted with the body and carried thereby. When the base is resting on the ground and the body is resting on the base, it is rotatably supported on the base by means of the rollers 12 in a well known manner.

13 may indicate a boom, arm, or the like, which may cary a drag line bucket (not shown), or any other suitable excavating, lifting apparatus, or the like. Suitable means (not shown), of course, may be provided for elevating and supporting the boom. The details of any excavating apparatus, or the like, need not be described herein, since this invention relates primarily to the propelling means for the body 10.

The propelling means includes two legs 14, 14 on opposite sides of the body, each provided with a foot 15 connected thereto by the pivot joint 16.

21 indicates a shaft carried by the body 10 a short distance above the platform 10b. Suitable means (not shown) are provided on the platform for rotating the shaft 21. The shaft 21 carries a crank 23 at each end, the cranks having identical angular positions on the shaft. Since the crank positions on each side of the body and the leg construction are the same, it will be sufficient to describe in detail the construction on one side of the body, it being understood that the other side is the same and that both legs operate simultaneously in the walking operation.

The crank 23 carries a crank-pin 24 connected to the leg 14 by means of a link 25 pivotally pinned at its upper end to the leg by the pin 26.

That is, the crank-pin 24 hangs from the leg by the link 25.

The crank 23 also carries another crank-pin 27, here shown as mounted on the crank-pin 24, but having a different radius. In speaking of the radius of either crank-pin, it is understood, of course, that the same is measured from the center of the crank-pin to the center of the shaft. That is, the radius of the pin 27 is greater than the radius of the pin 24. The leg 14 is provided with a slot 28 through which the crank-pin 27 extends and the latter carries a flange roller 29 operating in such slot. The slot 28 is long enough so that in the walking movement, the roller 29 does not engage either the upper or the lower end. That is, none of the weight is taken by the roller 29 or crank-pin 27. The sides of the slot 28 are provided with rails 28a, however, having a reasonably close fit with the sides of the roller 29 so that as the shaft 21 rotates, the roller 29 on the crank-pin 27 will swing the leg.

The member 10d is rigidly mounted on the body 10 and the ends may be supported, for example, by side braces 10e. The outer ends of the cross-member 10d are provided with pins 30 carrying grooved rollers 31 operating in slots 32 in the upper ends of the legs. Here again the slot 32 is long enough so that the roller does not engage either the upper or the lower end; but the slot is narrow enough so as to give a reasonably close fit for the roller 31. Movement of the pin 27, therefore, will cause the leg 14 to swing about the roller 31 as a center.

In the walking operation, the shaft 21 is rotated counter-clockwise and this causes the body and the legs to be alternately raised, advanced and lowered. The legs are long enough so that when the cranks are turned upwardly the body will rest on the ground and the feet will be raised from the ground. When the cranks are turned downwardly, on the other hand, the feet will rest on the ground and the body will be substantially raised from the ground. The body is not exactly balanced and consequently when it is substantially lifted or raised from the ground one end will rest or drag on the ground. When the body is raised, the weight is carried through the links 25 connecting the legs to the crank-pins 24. When the cranks 23 are turned upwardly, the links 25 act as thrust members to lift the legs. That is, when the legs are raised, they are supported through the links 25 from the crank-pins 24. When the legs are raised, however, their lower ends will be swung forwardly by the rollers 29 mounted on the crank-pins 27 and operating against the sides of the slots 28. Since the pins 27 are on longer radii than the pins 24, the legs will be advanced or swung forwardly a greater distance than would be the case if the crank-pins 24 which lift the legs also advanced them or swung them forwardly.

In actual construction, since the center of gravity of the body is somewhat above the shaft 21, the body when lifted from the ground will tilt somewhat so that one end will drag on the ground as it is moved.

In the drawings the apparatus in all views is shown as walking from right to left as indicated by the arrows. Figs. 6 and 7 are diagrammatic views showing the older construction and it will be seen that as the body descends as shown in Fig. 7 the axis of the link 25 extended lies in front of (that is, to the left of) the connection 51 of the leg with the foot. This axis is indicated by the broken line 50. The principal feature of this invention is the provision of means to cause this moment to lie back of this point as the body descends. This serves to retard the descent. I have accomplished this by placing the pivot pin 26 connecting the upper end of the link to the leg to the left of (that is, in front of) the center line of the leg. See particularly Fig. 5. It will be seen therefore that as the body descends, the axis of the link as indicated by the line 50 lies back of (to the right of) the connection 51 between the leg and the shoe instead of in front of it as diagrammatically shown in Fig. 7 illustrating the old construction.

Figs. 8 and 9 are similar to Figs. 3 and 5 except that a longer link is shown. In this case the upper end of the link is attached to the shoe at the extreme upper end thereof as indicated by the pivot 126 corresponding to the pivot 26 of the other form. Here again it will be seen by reference to Fig. 9, however, that when the body 10 is descending the axis of the link as indicated by 50 lies back of the pivot 51.

In Fig. 10 I have shown diagrammatically the path of the foot as described in the older patents, for example 2,230,759. This is the path that would be described by the leg construction shown in Figs. 6 and 7. The path is indicated by the curve 60 resembling somewhat an ellipse. 61 may represent the ground line and it is to be noted that this line may be higher or lower than shown. 60 represents the path the foot would describe if the body were held stationary and the foot were allowed to move freely. Assuming 61 to be the ground line, then the portion of the curve 60 below this line, if rotated 180°, would represent the course of movement of the body. This would be the path 60a. With the link parallel with the leg and centrally arranged as in the older device as shown in Figs. 6 and 7, this path is symmetrical with respect to a horizontal line. That is, the body descends at 60b at the same angle at which it ascends at 60c.

If the upper end of the link is shifted to one side as shown in Fig. 11 this serves to lower the left-hand end of the path 160 slightly so that the path 160a representing the movement of the body is not symmetrical with respect to a horizontal line. It will be seen that the body descends through the curve 160b at a smaller angle with respect to a horizontal line than it ascends at 160c. In other words, as the body strikes the ground it is moving forwardly at a faster rate than in the older construction. Consequently, it is dragging the rear end at a faster rate and this acts as a brake to retard the movement of the body and thus lessen the shock when the body contacts the ground.

The construction of Fig. 12 shows the paths with a shorter link and it will be seen that the invention is here carried out in a similar manner. 260a represents the path of travel of the body and it will be seen that the slope at 260b is considerably more gentle than is the case at 60b in Fig. 10.

The invention can also be accomplished by merely moving the pivot pin 30 forwardly with respect to the shaft 21 as shown in Fig. 13. This serves also to lower the forward end of the curve 360 so that the descent of the body at 360b is gentle.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. Apparatus of the character described, including: a body; a shaft carried by the body; a crank on the shaft; a crank pin on the crank; a leg; a foot connected to the leg; a link having its upper end pivotally connected to the leg and its lower end pivotally mounted on the crank pin; and means whereby, upon rotation of the shaft, the body and leg alternately will be raised, advanced, and lowered; the axis of said link extended lying to the rear of the leg connection with the foot when the shaft is in its extreme forward position with respect to the crank pin.

2. Apparatus of the character described, including: a body; a shaft carried by the body; a crank on the shaft; a crank pin on the crank; a leg; a foot connected to the leg; a link having its upper end pivotally connected to the leg and its lower end pivotally mounted on the crank pin; and means whereby, upon rotation of the shaft, the body and leg alternately will be raised, advanced, and lowered; the axis of said link extended lying to the rear of the leg connection with the foot when the shaft is just forward of the crank pin.

3. Apparatus of the character described, including: a body; a shaft carried by the body; a crank on the shaft; a crank pin on the crank; a leg; a foot connected to the leg; a link having its upper end pivotally connected to the leg and its lower end pivotally mounted on the crank pin; and means whereby, upon rotation of the shaft, the body and leg alternately will be raised, advanced, and lowered; the axis of said link extended lying to the rear of the leg connection with the foot at all times when the shaft is forward of the crank pin.

4. Apparatus of the character described, including: a body; a shaft carried by the body; a crank on the shaft; a first crank pin on the crank; a leg; a foot on the leg; a pivotal connection between the leg and body above the shaft permitting substantially vertical movement of the leg with respect to the body; a second crank pin on the crank having a longer radius from the shaft than the first crank pin, said second crank pin having a pivotal connection with the leg permitting substantially vertical movement of said pin with respect to the leg; a link having its lower end pivotally connected to the first crank pin and its upper end pivotally connected to the leg forwardly of the pivotal connection between the leg and the body; and means whereby, upon rotation of the shaft, the body and leg alternately will be raised, advanced, and lowered.

5. Apparatus of the character described, including: a body; a shaft carried by the body; a crank on the shaft; a first crank pin on the crank; a leg; a foot on the leg; a pivotal connection between the leg and body above the shaft permitting substantially vertical movement of the leg with respect to the body; a second crank pin on the crank having a longer radius from the shaft than the first crank pin, said second crank pin having a pivotal connection with the leg permitting substantially vertical movement of said pin with respect to the leg; a link having its lower end pivotally connected to the first crank pin and its upper end pivotally connected to the leg; and means whereby, upon rotation of the shaft, the body and leg alternately will be raised, advanced, and lowered, the connections being so made that the path of the body upon leaving the ground will be more nearly vertical than upon striking the ground.

JOHN W. PAGE.